(12) United States Patent
Rydenhag et al.

(10) Patent No.: US 9,508,161 B2
(45) Date of Patent: Nov. 29, 2016

(54) DEVICE AND METHOD FOR PROCESSING NOTIFICATION DATA

(71) Applicant: BlackBerry Limited, Waterloo (CA)

(72) Inventors: Daniel Tobias Rydenhag, Gothenburg (SE); Per Åke Daniel Johansson, Malmö (SE)

(73) Assignee: BlackBerry Limited, Waterloo, Ontario (CA)

(*) Notice: Subject to any disclaimer, the term of this patent is extended or adjusted under 35 U.S.C. 154(b) by 118 days.

(21) Appl. No.: 13/718,846

(22) Filed: Dec. 18, 2012

(65) Prior Publication Data
US 2014/0168255 A1    Jun. 19, 2014

(51) Int. Cl.
G09G 5/00 (2006.01)
G06T 11/00 (2006.01)
G06T 11/60 (2006.01)

(52) U.S. Cl.
CPC ............... *G06T 11/00* (2013.01); *G06T 11/60* (2013.01)

(58) Field of Classification Search
None
See application file for complete search history.

(56) References Cited

U.S. PATENT DOCUMENTS

2005/0253807 A1* 11/2005 Hohmann et al. ............ 345/156
2006/0176271 A1* 8/2006 Polivy ................... G06F 1/1613
                                                                   345/156
2012/0117507 A1* 5/2012 Tseng et al. ................. 715/774
2012/0317498 A1* 12/2012 Logan et al. ................ 715/752
2013/0007665 A1* 1/2013 Chaudhri et al. ............ 715/830

OTHER PUBLICATIONS

European Patent Office, "The Extended European Search Report" issued in European Patent Application No. 12197897.7, dated May 14, 2013, 6 pages.
"Notifications",Android 4.1 r1—Oct. 25, 2012 3:07, Oct. 31, 2012, XP055061202, Retrieved from the Internet: URL:http://web.archive.org/web/20121031005124/http://developer.android.com/guide/topics/ui/notifiers/notifications.html, [retrieved on Apr. 25, 2013], 12 pages.

* cited by examiner

*Primary Examiner* — Xiao Wu
*Assistant Examiner* — Mohammad H Akhavannik
(74) *Attorney, Agent, or Firm* — Fish & Richardson P.C.

(57) ABSTRACT

A method of generating display objects comprises operating a processor to: detect an occurrence of an event; define a display time associated with a predefined duration following the occurrence of the event; generate a first display object for display for by a display device for the predefined duration, wherein the first display object is representative of the detected event; output the first display object on the display device; generate a second display object for display by a display device for the predefined duration, wherein the second display object is indicative of the display time; output the second display object on the display device; and update the second display object based on an elapsed time of the predefined duration. A device and executable computer program for performing the steps of the method is also provided.

18 Claims, 6 Drawing Sheets

DEVICE AND METHOD FOR PROCESSING NOTIFICATION DATA

TECHNICAL FIELD

The embodiments disclosed herein relate to a device, system and method for generating display data.

BACKGROUND

Electronic devices are commonly configured so that, on receipt of a communication, a 'pop-up' notification is output on a display for a predefined length of time. The pop-up notification often at least partially overlaps one or more selectable options output on the display prior to the output of the notification. A user of the device may read the notification and decide to continue using the device without opening the corresponding communication. However, if the user dismisses the notification as it 'times out', the user may accidentally input a selection of an option output underneath the notification.

BRIEF DESCRIPTION OF THE DRAWINGS

The present disclosure and the embodiments set out herein can be better understood with reference to the description of the embodiments set out below, in conjunction with the appended drawings which are.

DESCRIPTION

In a first aspect, there is provided a method of generating display objects. The method comprises operating a processor to: (a) detect an occurrence of an event; (b) define a display time associated with a predefined duration following the occurrence of the event; (c) generate a first display object for display for by a display device for the predefined duration, wherein the first display object is representative of the detected event; (d) output the first display object on the display device; (e) generate a second display object for display by a display device for the predefined duration, wherein the second display object is indicative of the display time; and (f) output the second display object on the display device.

In one example, the method further comprises operating the processor to (g) update the second display object based on one of an elapsed time of the predefined duration, or a progress of an animation. In one example, the second display object is therefore indicative of the elapsed time and/or the remaining time of the predefined duration. In a further example, the second display object is indicative of the progress of an animation sequence being performed/run/executed by the processor. In other words the second display object is an animation.

In one example the method comprises operating the processor to repeat step (g) until the predefined duration has expired. In this manner, the second display object is a notification for the user that the first display object will disappear without requiring a user to positively dismiss the first display object.

The display time may be one of: a remaining time of the predefined duration; or an elapsed time of the predefined duration.

The second display object may be output on the display device within the first display object. In this manner, the second display object may appear to be a sub-element of the first display object.

The processor may further operate to: generate a selectable display object for display by the display device for the predefined duration; and output the selectable display object on the display device.

The second display object may comprise a timer object and the processor may further operate to: output the second display object on the display device such that the timer object at least partially surrounds the selectable display object.

The method may further comprise: a touch sensitive input interface comprised within the display device detecting a first user input, the first user input comprising a selection of the selectable display object; and operating the processor, responsive to detection of the first user input, to cease output of the first display object and the second display object.

The processor may further operate to determine that the first user input corresponds to a first area of the display device, wherein the first user input comprises one or more of a gesture, a swipe, a click, or a selection.

The first area may correspond to an area of the display device on which the second display object is output.

The method may further comprise: a touch sensitive input interface comprised within the display device detecting a second user input; and operating the processor, responsive to detection of the second user input, to perform an operation associated with the event.

The processor may operate to determine that the second user input corresponds to a second area of the display device different to the first area, wherein the second user input comprises one or more of a gesture, a swipe, a click, or a selection.

The second area may correspond to an area of the display device on which the first display object is output.

Prior to detecting the occurrence of the event, the processor may further operate to: generate a third display object of information for display on the display device; and output the third display object on the display device. In this manner, the third display object may be output on the display device before the event occurs.

The processor may further operate to output the first display object on an area of the display device at least partly overlapping an area of the display device on which the third display object is output. For example, the first display object may partially obscure the user's view of the third display object that was output on the display device prior to the occurrence of the event.

The processor may further operate to output the third display object on the display device before and after output of the first and second display objects on the display device.

The event may comprise receipt of an incoming communication.

The first display object may comprise information pertaining to the incoming communication.

In a second aspect, there is provided a computer-readable medium comprising executable instructions which, when executed, cause a processor to perform the above methods.

In a third aspect, there is provided a mobile electronic device for generating display objects, the device comprising: a display device; and a processor in communication with the display device, wherein the processor is configured to: detect an occurrence of an event; define a display time associated with a predefined duration following the occurrence of the event; generate a first display object for display for by a display device for the predefined duration, wherein the first display object is representative of the detected event; output the first display object on the display device; generate a second display object for display by the display device for the predefined duration, wherein the second display object is indicative of the display time; output the second display object on the display device; and update the second display object based on the elapsed time of the predefined duration.

The device may further comprise an input interface for detecting a user input, wherein the processor is in communication with the input interface.

The input interface may comprise a touch sensitive interface comprised within the display device.

The processor may be configured, responsive to detection of a first user input by the input interface, to cease output of the first display object and the second display object.

The processor may be configured to: determine that the first user input corresponds to a first area of the display device, wherein the first user input comprises one or more of a gesture, a swipe, a click or a selection.

The first area may correspond to an area of the display device on which the second display object is output.

The processor may be configured, responsive to detection of a second user input by the input interface, to perform an operation associated with the event.

The processor may be configured to: determine that the second user input corresponds to a second area of the display device different to the first area, wherein the second user input comprises one or more of a gesture, a swipe, a click, or a selection.

The second area may correspond to an area of the display device on which the first display object is output.

The device may further comprise: a receiver, wherein the processor is in communication with the receiver; and wherein the processor is configured to detect the occurrence of an event if a communication is received by the receiver.

This disclosure below is a description of one or more exemplary embodiments which are not intended to be limiting on the scope of the appended claims.

Figure 1:
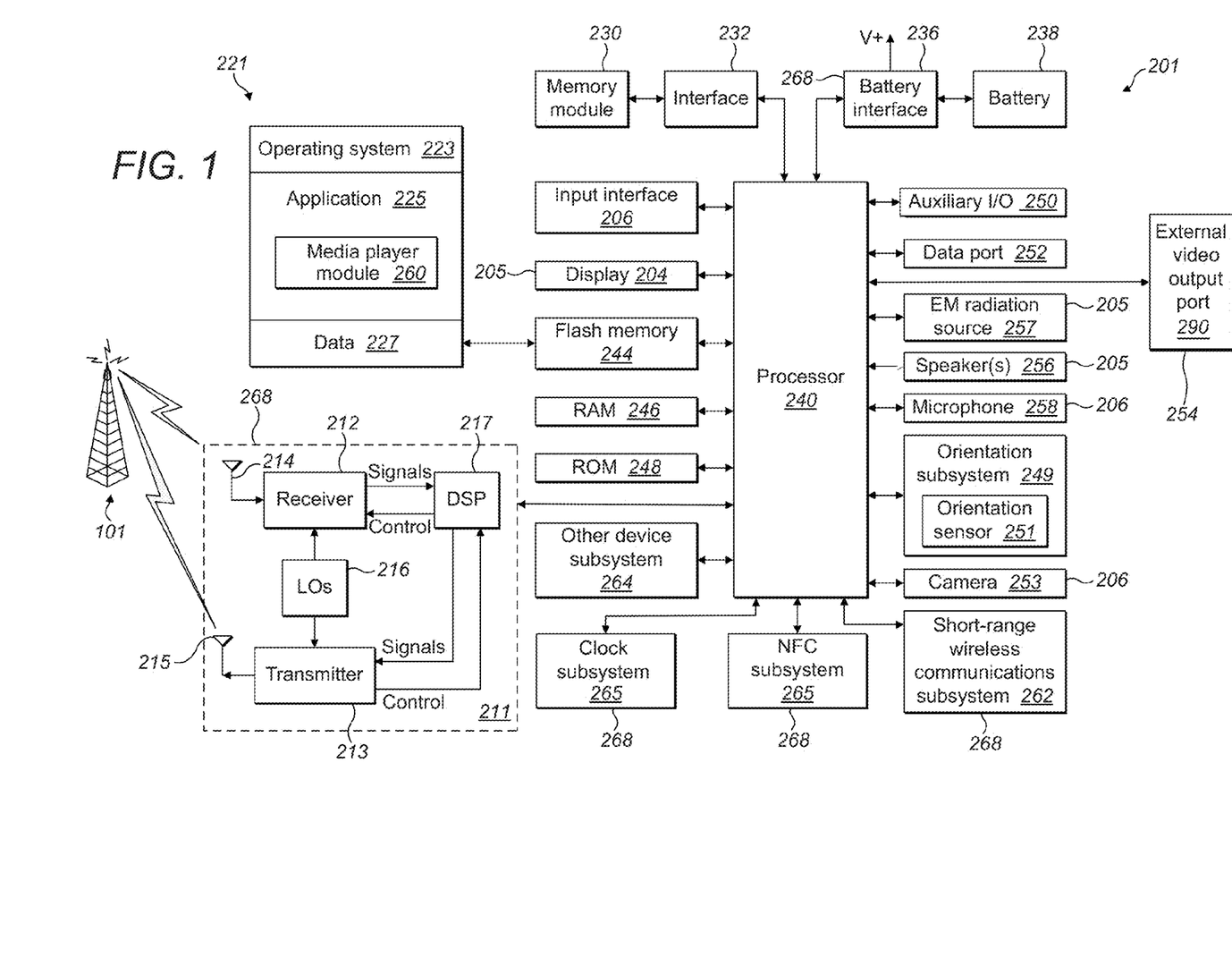
FIG. 1 is a schematic diagram illustrating components of an exemplary electronic device usable by a user in some embodiments.

Reference is made to FIG. 1 which illustrates an exemplary electronic device 201 which is usable in accordance with the disclosure below. An electronic device 201 such as the electronic device 201 of FIG. 1 is configured to generate a user-controllable interface on a built-in display or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection.

It will be appreciated that, in other embodiments, some of the features, systems or subsystems of the electronic device 201 discussed below with reference to FIG. 1 may be omitted from electronic devices 201 which are intended to perform solely operations in relation to the generation and output of display data and the modification of media content output.

In the illustrated exemplary embodiment, the electronic device 201 is a communication device and, more particularly, is a mobile communication device having data and voice communication capabilities, and the capability to communicate with other computer systems; for example, via the Internet. It will be appreciated that the electronic device 201 may take other forms, including any one of the forms listed below. Depending on the functionality provided by the electronic device 201, in certain exemplary embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket.

The electronic device 201 includes a controller including a processor 240 (such as a microprocessor) which controls the operation of the electronic device 201. In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one exemplary embodiment is the flash memory 244. In various exemplary embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one example, the system clock comprises its own alternate power source. The system clock provides an indicator of a current time value, the system time, represented as a year/month/day/hour/minute/second/milliseconds value. In other examples, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain exemplary embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some exemplary embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The processor 240 is in communication with the memory and the touch-sensitive input interface 206 to detect user input via the input interface 206. The processor 240 then generates or updates display data comprising a display object for display by the display device 204 in accordance with the user input. The processor 240 then outputs the display data for display on the display device 204. In an example, the user input comprises a swipe gesture across the touchscreen interface 206.

In at least some exemplary embodiments, the touch-sensitive overlay has a touch-sensitive input surface which is larger than the display 204. For example, in at least some exemplary embodiments, the touch-sensitive overlay may extend overtop of a frame (not shown) which surrounds the display 204. In such exemplary embodiments, the frame (not shown) may be referred to as an active frame since it is capable of acting as an input interface 206. In at least some exemplary embodiments, the touch-sensitive overlay may extend to the sides of the electronic device 201.

As noted above, in some exemplary embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some exemplary embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some exemplary embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some exemplary embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some exemplary embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some exemplary embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some exemplary embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some exemplary embodiments, the orientation subsystem 249 includes other orientation sensors 251, instead of or in addition to accelerometers. For example, in various exemplary embodiments, the orientation subsystem 249 may include a gravity sensor, a gyroscope, a tilt sensor, an electronic compass or other suitable sensor, or combinations thereof. In some exemplary embodiments, the device orientation subsystem 249 may include two or more orientation sensors 251 such as an accelerometer and an electronic compass.

The electronic device 201, in at least some exemplary embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some exemplary embodiments, an electronic device 201 includes a plurality of speakers 256. For example, in some exemplary embodiments, the electronic device 201 includes two or more speakers 256. The two or more speakers 256 may, for example, be disposed in spaced relation to one another. That is, in at least some exemplary embodiments, the electronic device 201 may include a first speaker and a second speaker and the first speaker and the second speaker may be spatially separated from one another within the electronic device 201. In at least some exemplary embodiments, the display 204 may be disposed between the first speaker and the second speaker of the electronic device. In such exemplary embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some exemplary embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some exemplary embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such exemplary embodiments, the direction of capture of the camera is always predictable relative to the display 204 or the housing. In at least some exemplary embodiments, the camera may be provided in a central location relative to the display 204 to facilitate image acquisition of a face.

In at least some exemplary embodiments, the electronic device 201 includes an electromagnetic (EM) radiation source 257. In at least some exemplary embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some exemplary embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some exemplary embodiments, the electromagnetic radiation source 257 is an infrared (IR) radiation source which is configured to emit infrared radiation. In at least some exemplary embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some exemplary embodiments, the camera 253 is configured to capture at least some electromagnetic radiation which is not in the visible spectrum.

In some exemplary embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some exemplary embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of an incoming message being received by the electronic device 201. The incoming message may be an email, a message received via a social networking website, an SMS (short message service) message, or a telephone call, for example.

The electronic device 201 is, in some exemplary embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as a media player module 260. In the exemplary embodiment of FIG. 1, the media player module 260 is implemented as a stand-alone application 225. However, in other exemplary embodiments, the presentation module 260 could be implemented as part of the operating system 223 or other applications 225.

As discussed above, electronic devices 201 which are configured to perform operations in relation to a communications log may take a variety of forms. In at least some exemplary embodiments, one or more of the electronic devices which are configured to perform operations in relation to the presentation module 260 are a smart phone or a tablet computer.

Figure 2:
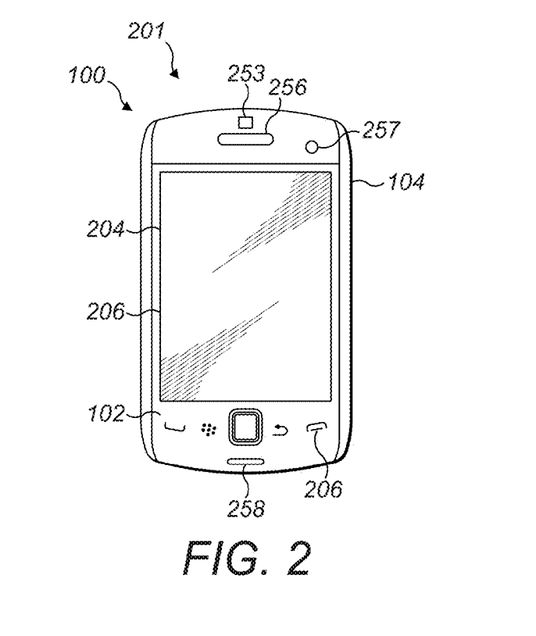
FIG. 2 is a plan view of the upper external side of one exemplary electronic device usable by an end-user in some embodiments.

Referring now to FIG. 2, a front view of an exemplary electronic device 201 which in one example may be a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 includes all of the components discussed above with reference to FIG. 1, or a subset of those components. The smartphone 100 includes a housing 104 which houses at least some of the components discussed above with reference to FIG. 1.

In the exemplary embodiment, the smartphone includes a display 204, which may be a touchscreen which acts as an input interface 206. The display 204 is disposed within the smartphone 100 so that it is viewable at a front side 102 of the smartphone 100. That is, a viewable side of the display 204 is disposed on the front side 102 of the smartphone. In the exemplary embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the exemplary embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 2 includes a single speaker 256, in other exemplary embodiments, the smartphone 100 may include a greater number of speakers 256. For example, in at least some exemplary embodiments, the smartphone 100 may include a second speaker 256 which is disposed vertically below the display 204 when the smartphone is held in a portrait orientation where its height is longer than its width (i.e. the orientation illustrated in FIG. 2).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of or surrounding the front side of the smartphone 100. Such electromagnetic radiation (or the projection of electromagnetic radiation onto objects) may be captured on images detected by the camera 253.

Figure 3:
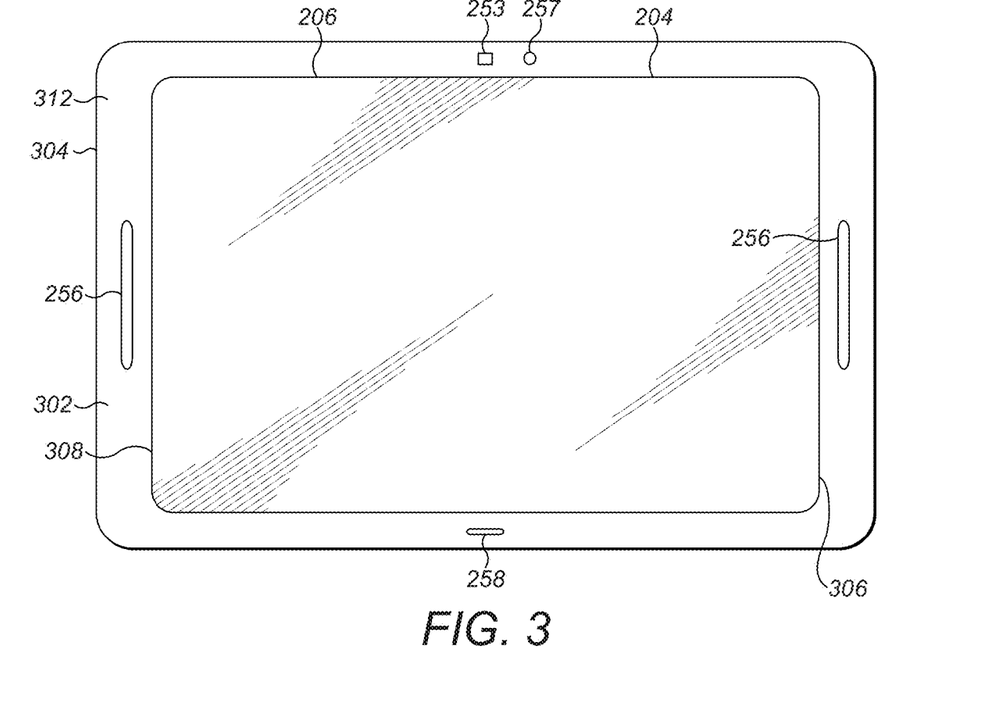
FIG. 3 is a plan view of the upper external side of one alternative exemplary electronic device usable by an end-user in some embodiments.

Referring now to FIG. 3, a front view of an example electronic device 201, which in one example may be a tablet computer 300, is illustrated. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the exemplary embodiment illustrated, the display 204 is framed by the housing 304.

A frame 312 surrounds the display 204. The frame 312 is portion of the housing 304 which provides a border around the display 204. In at least some exemplary embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The exemplary tablet computer 300 includes a plurality of speakers 256. In the exemplary embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the tablet computer 300.

The exemplary tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other exemplary embodiments.

The exemplary tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of or surrounding the front side 302 of the tablet computer 300. Such electromagnetic radiation (or the projection of electromagnetic radiation onto objects) may be captured on images detected by the camera 253.

The tablet computer 300 may have the ability to run third party applications which are stored on the tablet computer.

The electronic device 201, which may be tablet computer 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-user's text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a web-site using a browser on any internet-enabled electronic device.

Figure 4:
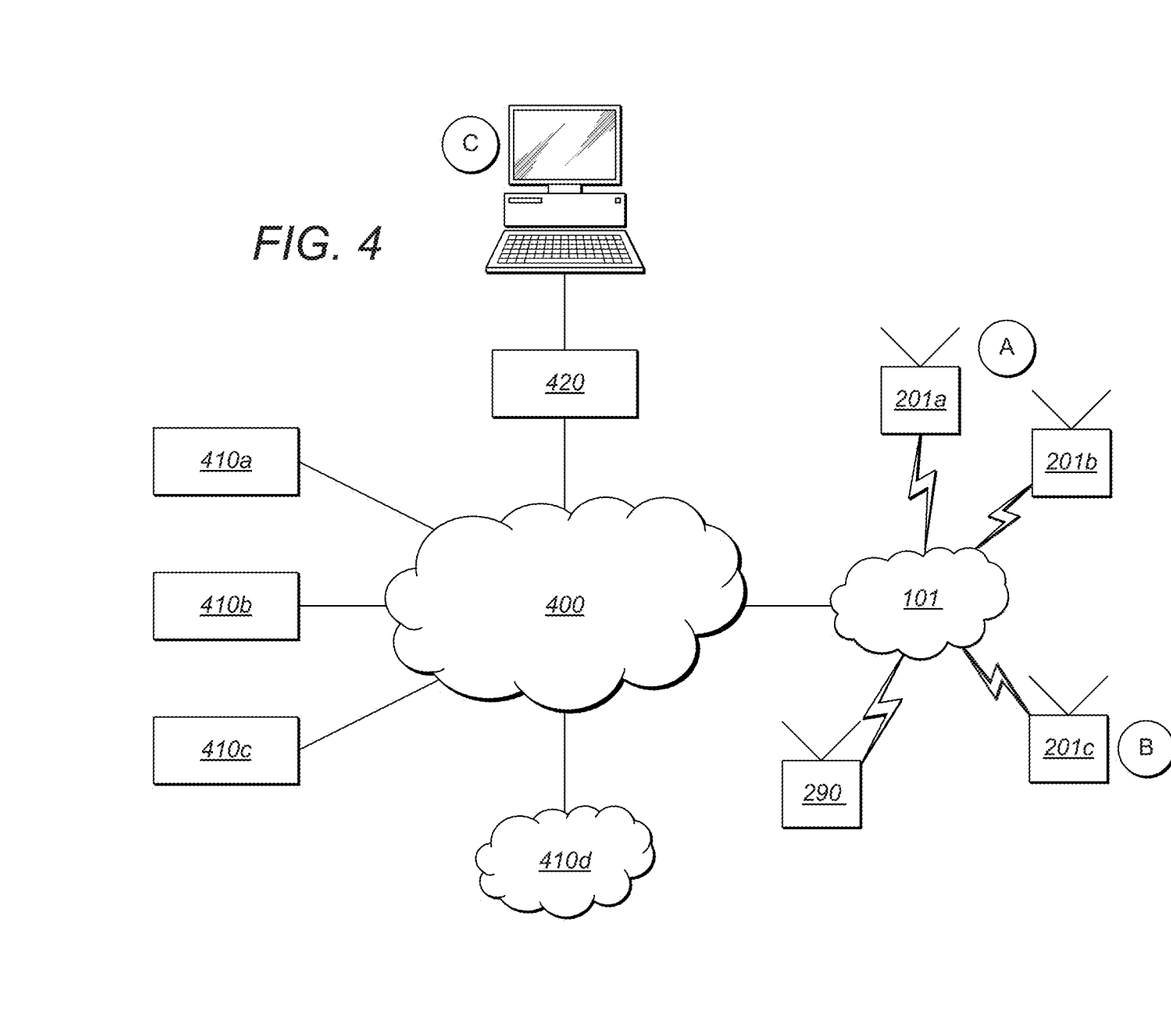
FIG. 4 is a schematic diagram of an exemplary system in which the aforementioned electronic devices can be employed in some exemplary embodiments.

FIG. 4 shows a system of networked apparatus by which electronic communications can be sent and received using multiple electronic devices 201a, 201b, 201c. Referring to FIG. 4, electronic devices 201a, 201b and 201c are connected to wireless network 101 to perform voice and data communications, and to transmit data to an external display device 290 residing on the wireless network. Wireless network 101 is also connected to the communications network 400, e.g. Internet. Electronic device 201a may be a tablet computer similar to tablet computer 300 described in FIG. 2 above. Electronic devices 201b and 201c may be smartphones. Electronic device 201d is a computing device such as a notebook, laptop or desktop, which is connected by a wired broadband connection to Local Area Network 420, and which is also connected to the communications network 400. Electronic devices 201a, b, c, d may access the communications network 400 to perform data communications therewith.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers.

Other servers and services may of course be provided allowing users of electronic devices 201a, 201b, 201c and 201d to send and receive electronic communications by, for example, Voice over IP phone calls, video IP calls, video chat, group video chat, blogs, file transfers, instant messaging, and feeds.

Wireless network 101 may also support electronic communications without using communications network 400. For example, a user of smart phone 201b may use wireless network 101 to make telephony calls, video calls, send text messages, send multimedia messages, and send instant messages to smart phone 201c, and to display application data on a display screen of the external display device 290, or control the display of application data.

The example shown in FIG. 4 is intended to be non-limiting and additional network infrastructure may of course be provided, such as a Public Switched Telephone Network (not shown), which may be used, for example, to make telephony calls using smartphone 201b to a wired phone (not shown).

In order to explain certain example modes of operation, reference is made below to FIGS. 5 to 7, 8a, 8b, 9a and 9b.

Figure 5:
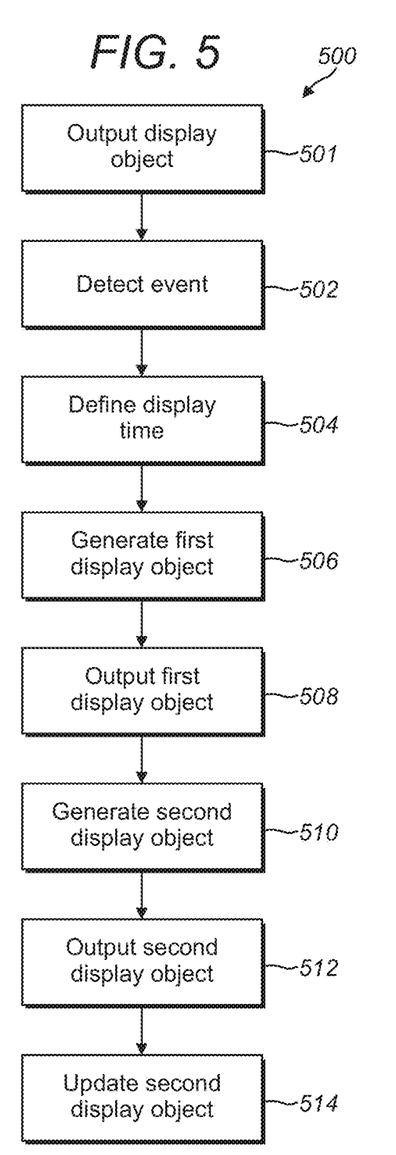
FIG. 5 is a flow diagram showing a method for generating display data.
Figure 8A:
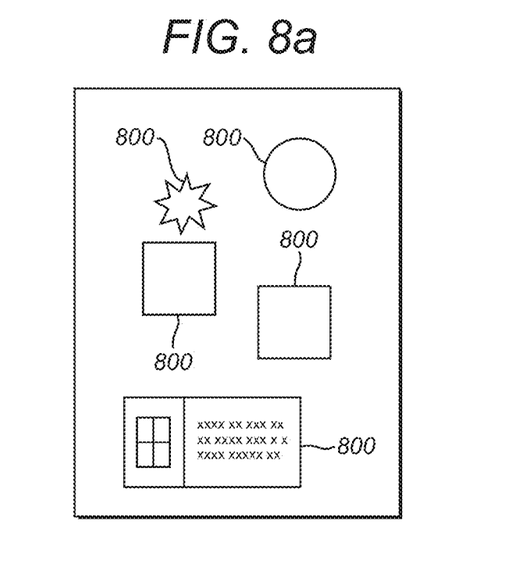
FIGS. 8a and b are example displays showing outputs of the generated display data.
Figure 8B:
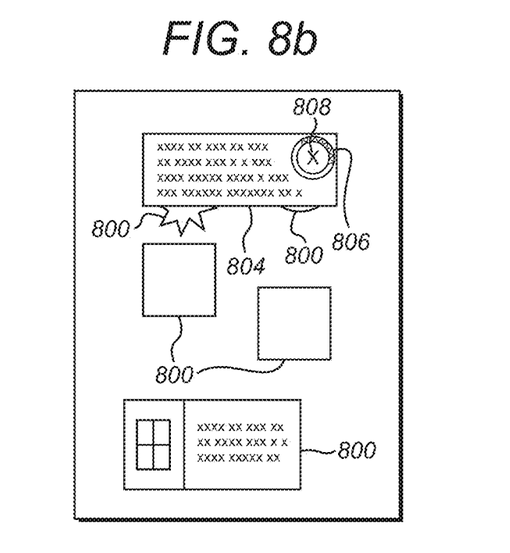

FIG. 5 is a flow chart depicting a method 500 performed by the processor 240 for generating the display objects which are output on the display screen 204. FIGS. 8a and 8b depict the display screen 204 and the display objects 800 that are output by the processor 240 during performance of the method 500.

At block 501, the processor outputs one or more display objects 800 on the display 204. The display objects 800 may correspond to one or more processes or applications being executed by the processor 240. One or more of the display objects 800 may be a display object 808 corresponding to a selectable option referred to as a 'selectable display object' in the following. Responsive to detection of a user input selecting a selectable display object, the processor 240 performs an operation or action associated with the selectable display object.

For example, a selectable display object may be representative of an application installed on the device 201. In this case, responsive to detection of a user input selecting the selectable display object, the processor 240 'opens' or 'runs' the application (i.e. begins execution of the instructions associated with the application).

As is known in the art, a display object corresponding to a process may be 'maximized' so that no other display objects are visible. For example, if the processor 240 is executing a process causing output of an image, the image may be viewed using the 'full screen' thereby preventing any further display objects from being simultaneously viewed. Alternatively, it may be possible to view multiple display objects 800 simultaneously on the display 204. These multiple display objects 800 may be connected with the operation of a single given process or application which is being executed or performed by the processor 240. Additionally, one or more display objects 800 may be displayed so as to partially overlay other display objects, thereby obscuring the view of the other display objects.

In exemplary embodiments depicted in FIGS. 8a, 8b, 9a and 9b, the display objects 800 are displayed over a background image or 'screen saver' 802.

At block 502, the processor 240 detects the occurrence of an event. The event may be any change in the status of the device 201, a device or network to which the device 201 is connected, or one or more processes being executed on the device 201.

For example, the processor 240 may determine that an event has occurred: if the charge of the battery 238 falls below a predefined threshold; if a connection to a network, a device, or a power source, is successfully established; if the device 201 is disconnected from a network, a device or a power source; if an error occurs in a process being executed by the processor 240; if execution of a process by the processor 240 is completed; if an amount of available memory space reaches a predefined threshold; if a message (e.g. email, text, multimedia or SMS message) is received by the device 201 over the communications network 400, if a voice call arrives or is detected by the device 201; or if any other occurrence is detected by the processor 240. The detection of the event may take place immediately as soon as the event occurs, or very shortly, e.g. less than 5, 4, 3, 2 or 1 s after its occurrence.

In the exemplary embodiments of FIGS. 8a, 8b, 9a and 9b, the processor 240 detects that an event has occurred when a voice communication (e.g. call), data communication or data message is received by the communication subsystem or arrives at the device 201. In an exemplary embodiment, the processor 240 detects that an event has occurred when the communication subsystem provides an indicator of an incoming message being received by the device 201. For example, the incoming message may be an email, a message received via a social networking website, an SMS (short message service) message, a telephone call, or any other type of incoming message.

At block 504, the processor 240 defines a display time associated with a predefined duration following the occurrence of the event. The predefined duration may be any length of time associated with the occurrence of the event or a process associated with the event. In an exemplary embodiment in which the event is the receipt of an email, the processor 240 may define the predefined duration in accordance with a pre-set duration assigned by an email messaging application. Additionally or alternatively, the processor 240 may define and/or store the predefined duration in accordance with an input by a user of the device 201, or by any other suitable means. Thus, the fixed time may be configurable by the user and stored within the device 201.

Similarly, the display time may be any length of time associated with the predefined duration. For example, the processor 240 may define the display time to be one or other of a remaining time of the predefined duration or an elapsed time of the predefined duration.

At block 506, the processor 240 generates a first display object 804 for display by the display 204 for the predefined duration. Generation of the first display object may, for example, comprise the processor 240 generating display data comprising a first display object 804 representative of, or associated with, the detected event.

The first display object 804 may be any suitable display object for outputting an indication or notification that the processor 240 has detected an occurrence of the event. For example, if the event is an incoming telephone call being received by the device 201, the first display object 804 may comprise a symbol, such as a telephone, that is indicative that an incoming call is being received. Additionally or alternatively, the first display object 804 may be information, such as an image or text, identifying the caller making the incoming call.

Figure 9A:
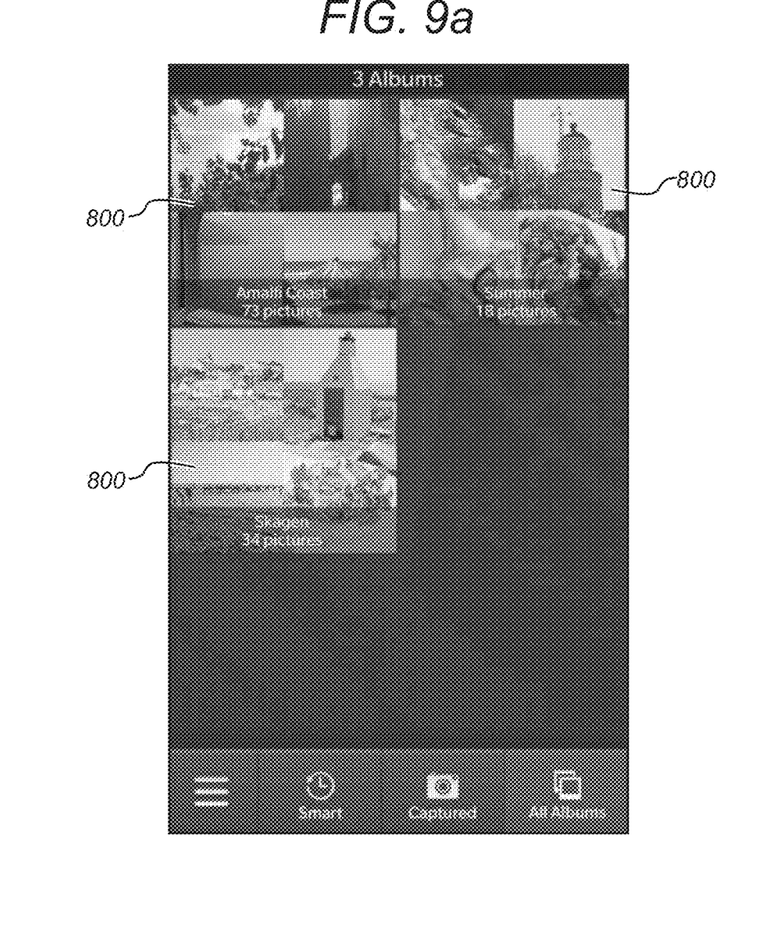
FIGS. 9a and b are example displays similar to the displays depicted in FIGS. 8a and b.
Figure 9B:
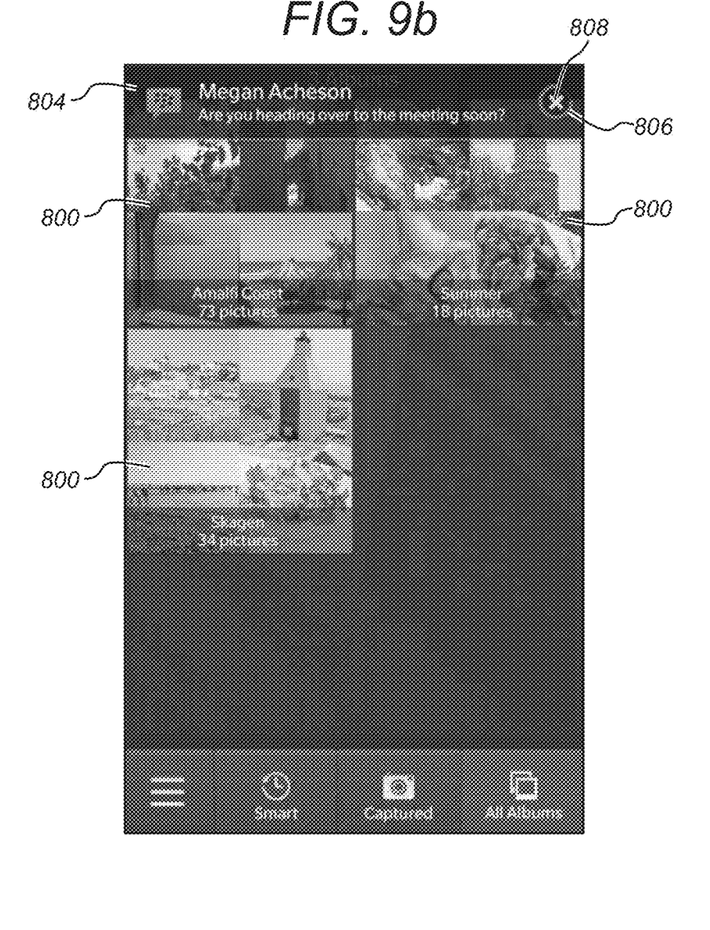

In the exemplary embodiments of FIGS. 8b and 9b, in which the event is the communications subsystem 211 providing an indication that an email has been received by the device 201, the first display object 804 is a message notification comprising text representative of, or comprised within, the email message. It will be appreciated that the first display object 804 may also comprise an envelope symbol, a mailbox symbol, or any other graphic that is indicative that an email has been received by the device 201. Additionally or alternatively, the display object may comprise information such as the sender of the email, the size of the email, whether the email comprises attachments, the subject line of the email, or any other information related to the email message.

At block 510, the processor 240 generates a second display object 806 for display by the display 204 for the predefined duration. The second display object 806 is indicative or representative of the display time. For example, the second display object 806 may comprise one or more of: a 'timer object' formed from an outline or filled-in shape of an arrow; text; an egg-timer symbol; a circle, square, rectangle, ellipse, alphabetic text character or characters or other shape; or a number of these elements grouped together as a display object.

As with the first display object 804, the processor 240 may generate the second display object 806 by generating display data comprising the display object.

At block 512, the processor 240 outputs the second display object 806 on the display 204. The processor 240 may output the second display object 806 on the display 204 within the first display object 804. Additionally or alternatively, the processor 240 may output the second display object 806 so that it surrounds, or partially surrounds, one or more selectable display objects on the display 204.

In the exemplary embodiments depicted in FIGS. 8a, 8b, 9a and 9b, the second display object 806 includes at least a circular icon or symbol output on the display 204 such that the circular icon is displayed within, or partially overlapping, the first display object 804. In particular, in the depicted example, the circular icon is output so that it surrounds a selectable display object 880. In this example, the selectable display object comprises an 'X' icon, the selection of which causes the processor 240 to close or dismiss the message notification and the display objects associated therewith.

In an exemplary embodiment, the second display object comprises an outline which may be filled-in, shaded-in, coloured-in, or obscured with respect to the background over time, representing an elapsed time in relation to predefined duration. In the exemplary embodiments of FIGS. 8b and 9b filling the colour on the circular icon is indicative of the elapsed or remaining display time. In particular, in this example, at block 504, the display time is defined to equate to a remaining time of the predefined duration. The fill colour of the circular icon indicates the remaining display time of the predefined duration. Or in other words the amount of time that the first and second display objects 804, 806 will continue to be displayed (assuming no other event is detected) before ceasing to be displayed. This is because the visible portion of the icon that is filled-in, or which is distinctively coloured, e.g. dark-coloured, vis-à-vis the surrounding background or outline of the shape corresponds or is in proportion to the remaining portion of the predefined duration. In this regard, the proportion which corresponds to the remaining portion can correlate directly to: the filled or distinctively coloured portion of the second display object 806, which may include the extent of fill or colouring around the circumference of the display object 806, or of the whole area of the display object 806. In FIGS. 8b and 9b, it is the extent of fill around the circumference of the circular icon which is representative of the remaining portion or elapsed portion of the predefined duration.

It will be appreciated that the output depicted in FIGS. 8b and 9b may also correspond to an exemplary embodiment in which, at block 504, the display time is defined to be the elapsed time of the predefined duration. In a general sense, it is thus the unfilled or light-coloured portion of the second display object 806 which corresponds to the display time.

At block 514, the processor 240 updates the second display object 806 based on an elapsed time of the predefined duration. In an exemplary embodiment, updating the second display object 806 comprises the processor 240 determining the elapsed time of the predefined duration. This determination may be made by any suitable means. For example, the processor 240 may obtain an indicator of the time value at which the event occurred, the 'event time' from the clock subsystem 266. When updating the second display object 806, the processor 240 may obtain an indicator of the current time value from the clock subsystem 266. The processor 240 then determines the elapsed time of the predefined duration by comparing the current time value to the event time.

The processor 240 may update the second display object 806 by any suitable means to indicate the elapsed time of the predefined portion. In an exemplary embodiment, the second display object 806 has one or more visual parameters associated with it which can be varied in accordance with the elapsed time of the predefined duration. For example, the visual parameters may comprise one or more of brightness, colour, contrast, opacity, frequency, amplitude, speed, or the number or thickness of a plurality of lines (e.g. hatching). The processor 240 may update the second display object 806 by changing/modifying/varying one or more of these parameters so as to indicate one or both of the elapsed time, and a progress of an animation. In one example, the one or more parameters are changed/modified/varied in proportion to the elapsed time. The one or more parameters may additionally or alternatively be changed/modified/varied in proportion to progress of an animation being executed/run/output by the processor.

In the exemplary embodiments depicted in FIGS. 8a, 8b, 9a and 9b, updating the second display object 806 comprises updating the visual parameters of the second display object 806 to modify the portion of the circular icon that is filled-in or dark-coloured (or alternatively modifying the portion of the circular icon that is light-coloured) to reflect the remaining (or elapsed) portion of the predefined duration.

In an exemplary embodiment, the processor 240 repeats the step of updating the second display object 806 at predefined intervals until the processor 240 determines that the predefined duration has expired.

On determining that the predefined duration has expired, the processor 240 'closes', times out, or ceases output of, the first and second display objects, and any other display objects displayed within, or in association or conjunction with, the first and second display objects. Processing then reverts to block 501, at which the display objects 800 that output on the display 204 prior to the detection of the event, are again output on the display 204. In the exemplary embodiments of FIGS. 8a, 8b, 9a and 9b, the output on the display screen reverts to the output depicted in FIGS. 8a and 9a.

Figure 6:
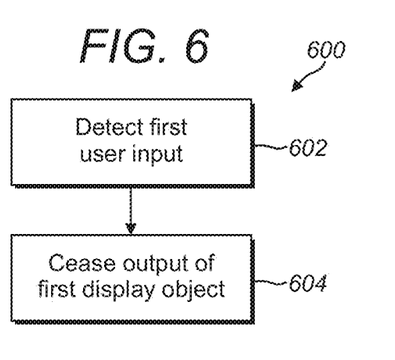
FIG. 6 is a flow diagram showing an exemplary method for generating display data.

FIG. 6 depicts a flow chart of a method 600 performed by the processor 240. The method 600 may be performed subsequent to, or in parallel with, the method 500.

At block 602, the processor 240 detects a first user input via the input interface 206. The input may comprise any suitable input for issuing a command to the processor 240 via the input interface 206. For example, the input interface 206 may comprise the touchscreen, in which case the electronic device 201 may be referred to as a 'multi-touch device'. The input detected by the touchscreen interface may comprise any suitable user touch-based input. For example, the input may comprise a gesture input such as a tap, a multi-tap, a long press, a swipe or scroll or slide, a pan, a flick, a multi-swipe, a multi-finger tap, a multi-finger scroll or swipe, a pinch, a two-hand pinch, a spread, a two-hand spread, a rotation, a two-hand rotation, a slide and rotation, a multi-direction slide, a multi-finger slide and rotation, a multi-finger slide, etc. It will be appreciated that the gesture input may comprise a sequence of input elements or stages performed within a specified or predetermined time frame, for example, a three-tap gesture in which each tap comprises an element (or a sub-input, a phase or a stage) of the input and the three taps are performed within a time frame that enables the processor 240 to detect the taps as elements of a single input. Additionally or alternatively, an input may comprise removing a point of contact, e.g. a finger or stylus, from the touchscreen interface.

Although many examples described herein refer to a gesture detected by a touch-sensitive display, other methods of gesture detection may be utilized. For example, a gesture may be a generalized trajectory description characterized as a sequence of 3D points in time, and as such many different sensors may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known.

An accelerometer or gyroscope may be utilized to detect 3D spatial gestures. A sequence of acceleration values may be detected in the different spatial dimensions as a function of time and constitute trajectory information that can be recognized as a gesture. For example, a quick flick or tilt of the portable electronic device are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device.

A gesture input is different to input of a command by manipulation of a control component presented on the screen because a gesture input can be performed at any location within the display screen (or a large area of the display screen) in contrast to a single contact point for a user finger or input stylus on a corresponding control element. In order to input a command using a control component, the user must contact the screen at a specific location corresponding to that component. For example, in order to change an output volume using a volume control, the user must select the volume control by touching the location at which the volume control is displayed and moving the displayed control element by a desired amount through movement of the user's finger across the screen. Such user input must therefore be precisely controlled in order to use control elements to input commands. Gesture-based inputs, on the other hand, do not require the same precise control as they are not tied to a specific display object on the screen, but may instead correspond to an area or sub-area of the screen.

In an exemplary embodiment, the processor 240 detects the first user input via the input interface and determines that the first user input corresponds to a first area of the display 204. For example, the first user input may comprise one or more of a gesture or a swipe across the area of the display 204 on which the second display object 806 is output. Additionally or alternatively, the first user input may comprise a selection of a selectable display object, option or 'icon' that is at least partially surrounded by or adjacent to the area of the display 204 on which the second display object 806 is displayed. In the exemplary embodiments of FIGS. 8b and 9b, the first user input comprises a selection of the 'X' icon 808 made by tapping the area of the display on which the 'X' icon is displayed.

It will be appreciated that, without an indication of the elapse time, the user may miss-time selection of the 'X' icon just as the notification is about to disappear. As such, if the input is on or after expiration of the predefined duration for displaying the message notification, the user input will instead result in selection of an option corresponding to a selectable display object currently output on the display 204 in the area in which the 'X' icon was previously output. Responsive to this selection, the processor 240 will then execute a process or perform an action corresponding to the selected option, even though this action is not required by the user.

The execution of an unnecessary process in this manner results in inefficient use of both the processor 240 and the memory of the device 201. This is because processing and memory resources are assigned to the newly selected process. This waste of resources is further compounded by the fact that execution of a process cannot usually be ceased immediately. Accordingly, even if the user immediately selects to 'end' the process, processing and memory resources will not be released until such time as the processor 240 safely ceases execution of the process. Forcing the processor 240 to cease execution of a process before it is safe to do so may result in delays and an increase in required resources the next time the process is executed as verification of the process may be required before its execution.

Further inefficiencies may arise if the option mistakenly selected by the user corresponds to a process that cannot currently be executed by the processor 240. For example, if the user inadvertently inputs a selection of a web application when the device 201 cannot connect to the communications network 400, e.g. Internet, e.g. whilst the user is out of range of the network, e.g. travelling on a subway or underground train, the processor 240 will repeatedly try to establish a connection with the communications network 400 until the application can be successfully closed. In this case, not only are the processing resources inefficiently used, but battery power will also be quickly depleted.

However, the generation and output of the second display object 806 prevents the accidental selection of a display object other than the intended display object. This is because the second display object provides an indication of the remaining time for which the notification will be displayed, thereby notifying the user of whether selection of the notification will time out or close, in which case, an attempted selection of the 'X' icon will result in selection of an underlying display object.

In particular, the second display object 806 may be output on the display 204 so as to surround, or partially surround, the 'X' icon. Accordingly, the circular icon 804 is clearly visible to a user selecting the 'X' icon, thereby ensuring that the user is notified of the remaining display time before inputting a selection of the 'X' icon. In this way, a user may determine that the display time is nearly finished and the user can elect not to select the 'X' icon. Instead the user allows the predetermined time to expire such that the first and second display objects cease to be displayed without requiring user interaction. The second display object 806 is notification for the user that the first display object 804 will disappear without requiring a user to positively dismiss the first display object 804. This is particularly advantageous in devices which have a plurality of different notification messages, some of which are modal, meaning that user input is required to dismiss the notification, and others which are non-modal, meaning that the user can continue to interact with the underlying user interface without first dismissing the notification.

In the illustrated example the circular icon 804 is output on the display 204 so as to surround the 'X' icon 808. Accordingly, if a user inputs an instruction to close the notification by selecting the 'X' icon, e.g. via touchscreen 204 or other input device, such as a pointing device, the processor 240 detects that an input corresponding to an area within, or comprising, the area on which the circular icon 804 is displayed. Responsive to this detection, the processor 240 then ceases output of the message notification, in which case processing returns to block 501.

At block 604, the processor is operated, responsive to detection of the first user input, to cease output of the first and second display objects. In the exemplary embodiment of FIGS. 8b and 9b, responsive to detection of the first user input, the processor 240 'closes' the message notification 804 and all the display objects displayed within, or in association or conjunction with, the message notification 804 by ceasing to output them on the display 204.

Processing then reverts to block 501, at which the display objects output on the display 204 prior to the detection of the event are again output on the display 204. In the exemplary embodiments of FIGS. 8a, 8b, 9a and 9b, the output on the display screen reverts to the output depicted in FIGS. 8a and 9a.

Figure 7:
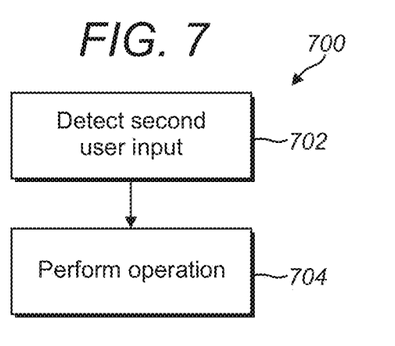
FIG. 7 is a flow diagram showing an exemplary method for generating display data.

FIG. 7 depicts a flow chart of a method 700 performed by the processor 240. The method 700 may be performed subsequent to, or in parallel with, the method 500 and may be performed as an alternative to the method 600.

At block 702, the processor 240 detects a second user input via the input interface 206. As discussed above in relation to the first user input, the second user input may comprise any suitable input for issuing a command to the processor 240 via the input interface 206.

In an exemplary embodiment, the processor 240 detects the second user input via the input interface and determines that the second user input corresponds to a second area of the display 204. For example, the second user input may comprise one or more of a gesture or a swipe across the area of the display 204 on which the first display object 804 is output. Additionally or alternatively, the second user input may comprise one or more of a click or a selection within the area of the display 204 on which the first display object 804 is displayed.

In the exemplary embodiments of FIGS. 8a, 8b, 9a and 9b, the event is the detection of an indicator from the communications subsystem 262 that an email message has been received by the device 201. In this example, the first display object 804 is a message symbol comprising text related to the received email message, and the second user input comprises one or more of a gesture or a swipe across the area of the display 204 on which the message symbol is displayed. Additionally or alternatively, the second user input may comprise one or more of a click, a tap, or a multi-tap input in the area of the display 204 on which the message symbol is displayed.

At block 704, the processor 240 is operated, responsive to detection of the second user input, to perform an action. In the above exemplary embodiment in which the event is the receipt of an email message, responsive to detection of the second user input, the processor 240 causes the email application to 'open' the received email message so that the received email message is displayed across all or part of the display 204. The user can then read the content of the received email message.

In a further exemplary embodiment, the event is the detection of an error in execution of a process by the processor 240 and the first display object 804 comprises a single line error message. In this case, responsive to detection of one or more of a gesture, a swipe or a tap within the area of the display 204 on which the error message is displayed, the processor 240 opens the application corresponding to the process in question.

As discussed in relation to block 604, if the user attempts to input a second input after expiration of the predefined duration for displaying the message notification, the user input will instead result in selection of an option corresponding to a selectable display object currently output on the display 204 in the area in which the message notification was previously output. Responsive to this selection, the processor 240 will then execute a process or perform an action corresponding to the selected option, even though this action is not required by the user.

However, once again, the generation and output of the second display object 806 prevents the accidental selection of a display object other than the intended display object. This is because the second display object provides an indication of the remaining time for which the notification will be displayed, thereby notifying the user of whether the notification is about to time out, in which case an attempted selection of the message notification will result in selection of an underlying display object.

It will be appreciated that the foregoing discussion relates to exemplary embodiments. However, in other embodiments, the order in which steps are performed may be changed or one or more of the described steps may be omitted.

The invention claimed is:

1. A method, comprising:
   detecting initiation of a communication having a communication type;
   determining a predefined duration associated with the initiation;
   for the predefined duration, displaying a communication notification representative of the communication type, the communication notification including a selectable object configured to establish the communication, and the predefined duration is assigned to all communication notifications for the communication type;
   for the predefined duration, displaying a second object that comprises an outline, includes a fill in at a start of the predefined duration, and the fill is removed along the outline according to a timer that corresponds to the predefined duration;
   receiving a selection of the selectable object prior to expiration of the predefined duration; and
   in response to the selection and prior to expiration of the predefined duration, displaying a window including the communication.

2. The method of claim 1, further comprising:
   detecting a selection of the selectable object; and
   in response to the selection, ceasing to display the selectable object and the second object.

3. The method of claim 2, wherein the selection comprises at least one of a gesture, a swipe, or a click.

4. The method of claim 1, wherein the second object comprises a circular icon displayed within or partially overlapping the selectable object.

5. The method of claim 1, further comprising displaying an 'X' icon on the selectable object, wherein selection of the 'X' icon ceases display of the selectable object and the second object.

6. The method of claim 1, wherein the fill is a shade or a color.

7. A mobile device, comprising:
   memory configured to store a predetermined duration; and
   one or more processors configured to:
   detect initiation of a communication having a communication type;
   determine a predefined duration associated with the initiation;
   for the predefined duration, display a communication notification representative of the communication type, the communication notification including a selectable object configured to establish the communication, and the predefined duration is assigned to all communication notifications for the communication type;
   for the predefined duration, display a second object that comprises an outline, includes a fill in at a start of the predefined duration, and the fill is removed along the outline according to a timer that corresponds to the predefined duration;
   in response to expiration of the predefined time duration, replace the communication notification with at least a portion of a third display object;
   receive a selection of the third display object; and
   execute a process corresponding to the third display object.

8. The mobile device of claim 7, the one or more processors further configured to:
   detect selection of the selectable object; and
   in response to the selection, cease to display the selectable object and the second object.

9. The mobile device of claim 8, wherein the selection comprises at least one of a gesture, a swipe, or a click.

10. The mobile device of claim 7, wherein the second object comprises a circular icon displayed within or partially overlapping the selectable object.

11. The mobile device of claim 7, the one or more processors further configured to display an 'X' icon on the selectable object, wherein selection of the 'X' icon ceases display of the selectable object and the second object.

12. The mobile device of claim 7, wherein the fill is a shade or a color.

13. A non-transitory computer readable medium storing instructions to cause one or more processors to perform operations comprising:
   detecting initiation of a communication having a communication type;
   determining a predefined duration associated with the initiation;
   for the predefined duration, displaying a communication notification representative of the communication type, the communication notification including a selectable object configured to establish the communication, and the predefined duration is assigned to all communication notifications for the communication type;
   for the predefined duration, displaying a second object that comprises an outline, includes a fill in at a start of the predefined duration, and the fill is removed along the outline according to a timer that corresponds to the predefined duration;
   when a selection of the selectable object is received prior to expiration of the predefined duration:
      displaying a window including the communication in response to the selection of the selectable object; and
   when the predefined duration expires without a selection of the selectable object:
      replacing the communication notification with at least a portion of a third display object;
      receiving a selection of the third display object; and
      executing a process corresponding to the third display object.

14. The computer readable medium of claim 13, the operations further comprising:
   detecting selection of the selectable object; and
   in response to the selection, ceasing to display the selectable object and the second object.

15. The computer readable medium of claim 14, wherein the selection comprises at least one of a gesture, a swipe, or a click.

16. The computer readable medium of claim 13, wherein the second object comprises a circular icon displayed within or partially overlapping the selectable object.

17. The computer readable medium of claim 13, the operations further comprising displaying an 'X' icon on the selectable object, wherein selection of the 'X' icon ceases display of the selectable object and the second object.

18. The computer readable medium of claim 13, wherein the fill is a shade or a color.

* * * * *

UNITED STATES PATENT AND TRADEMARK OFFICE
CERTIFICATE OF CORRECTION

PATENT NO. : 9,508,161 B2
APPLICATION NO. : 13/718846
DATED : November 29, 2016
INVENTOR(S) : Rydenhag et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 111 days.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*